March 14, 1933. J. GABOSCH 1,901,094
ADHESIVE TAPE
Filed Oct. 13, 1930
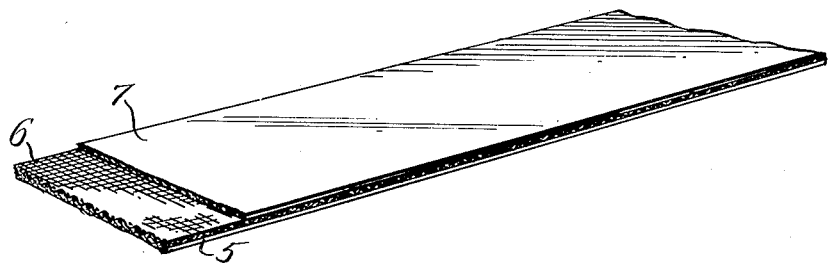
Inventor
John Gabosch
By: Carl S. Lloyd
Atty.

Patented Mar. 14, 1933

1,901,094

UNITED STATES PATENT OFFICE

JOHN GABOSCH, OF CHICAGO, ILLINOIS, ASSIGNOR TO THE KENDALL COMPANY, OF BOSTON, MASSACHUSETTS, A CORPORATION OF MASSACHUSETTS

ADHESIVE TAPE

Application filed October 13, 1930. Serial No. 488,203.

This invention relates to adhesives and particularly to an improved type of adhesive tape having certain novel features of construction.

In the ordinary forms of adhesive tape the adhesive mass or coating is applied to a cloth backing which gives the necessary strength to the tape. The adhesive adheres to one side of the cloth, the weave of the cloth being sufficiently fine to prevent the sticky mass from working through to the other side of the fabric. The cost of a cloth suitable for this purpose represents a very considerable portion of the cost of the entire article. According to my invention, instead of using cloth backing for the tape, I employ a backing of paper. In combination with the paper I use a gauze reinforcement for giving the necessary strength to the article. The gauze is obtainable at but a small fraction of the cost of the cloth used in the present forms of adhesive tapes, and when used in the manner of the invention, materially reduces the cost at which a tape of good quality may be produced.

The invention will be fully understood from the following detailed description, which, taken in conjunction with the accompanying drawing, discloses a preferred embodiment thereof.

Referring to the drawing, the figure is a perspective view of a strip of tape constructed according to the invention.

Referring to the drawing, the tape comprises a strip or sheet of paper 5, a layer of gauze 6 superposed on the paper 5, and an adhesive mass or coating 7 disposed over the gauze 6.

The weave of the gauze 6 may be coarse or fine depending upon the particular use for which the tape is intended. The ordinary limits for the mesh usually will fall between a 20/12 and 44/40 weave. Usually a coarsely woven gauze is preferred, inasmuch as the cost is roughly proportional to the fineness of the weave. The adhesive mass or coating 7 is of the type which remains sticky under ordinary atmospheric conditions, and does not require wetting or heating to render it adhesive. It usually consists of a rubber base together with certain softening agents, such as rosin, wax and the like. The paper 5 ordinarily is a plain strip or sheet; however, it may be creped if desired.

In making the tape the gauze or open mesh fabric 6 may be arranged upon the backing 5 of paper or other flexible material and the adhesive applied over the fabric and pressed therethrough by running the tape through the rolls of a calendering machine, or in other manner. The adhesive thus serves the double purpose of binding the reinforcing fabric to the backing and of providing a pressure-sensitive adhesive surface on the tape, the reinforcing fabric being disposed between the backing and the surface adhesive by which the tape is applied.

A tape made up in the manner described may be used just as in the manner of the ordinary cloth backed adhesive tape. It is suitable for use for medical purposes and also in the arts, as, for example, in the automobile painting industry, to mask certain portions of the body while a coating of paint is being applied to adjacent portions.

The backing provides a smooth surface so that the tape may be wound upon itself in the form of a roll. The gauze gives the necessary strength to the tape and, when used in conjunction with the paper backing, is a very satisfactory substitute for the cloth backing used in the ordinary form of adhesive tape.

The foregoing detailed description has been given for clearness of understanding only, and no unnecessary limitations should be understood therefrom, but the appended claim should be construed as broadly as permissible in view of the prior art.

What I regard as new and desire to secure by Letters Patent is:

An adhesive tape comprising a flexible backing, a reinforcing element of open mesh fabric, and an adhesive mass penetrating said fabric, binding the same to said backing and providing a pressure-sensitive adhesive surface for applying the tape.

In witness whereof, I hereunto subscribe my name to this specification.

JOHN GABOSCH.